(12) United States Patent
Cowelchuk et al.

(10) Patent No.: US 6,945,583 B1
(45) Date of Patent: Sep. 20, 2005

(54) TRIM PANEL ASSEMBLY HAVING AN INTEGRATED DOOR BUMPER AND METHOD OF MANUFACTURE

(75) Inventors: Glenn A. Cowelchuk, Chesterfield Twp., MI (US); Randy S. Reed, Fair Haven, MI (US); Michael P. Schoemann, Waterford, MI (US); John D. Youngs, Southgate, MI (US)

(73) Assignee: Lear Corporation, Southfield, MI (US)

( * ) Notice: Subject to any disclaimer, the term of this patent is extended or adjusted under 35 U.S.C. 154(b) by 17 days.

(21) Appl. No.: 10/852,276

(22) Filed: May 24, 2004

(51) Int. Cl.⁷ .............................................. B60J 10/08
(52) U.S. Cl. .................. 296/39.1; 296/1.08; 296/146.9
(58) Field of Search .............................. 296/37.1, 37.8, 296/37.12, 39.1, 24.3, 24.34, 24.35, 1.03, 296/1.08, 146.1, 146.9, 141

(56) References Cited

U.S. PATENT DOCUMENTS

| | | | | |
|---|---|---|---|---|
| 2,101,748 A | * | 12/1937 | Michel et al. | 362/496 |
| 4,029,353 A | * | 6/1977 | Barenyi et al. | 296/207 |
| 4,049,312 A | * | 9/1977 | Rudbeck | 296/178 |
| 4,549,761 A | * | 10/1985 | Lee et al. | 296/206 |
| 4,743,060 A | * | 5/1988 | Hishida | 296/37.12 |
| 4,818,014 A | * | 4/1989 | Kaye | 296/146.9 |
| 4,838,599 A | * | 6/1989 | Bruhnke et al. | 296/37.9 |
| 5,715,966 A | * | 2/1998 | Nagano et al. | 220/837 |
| 5,904,389 A | * | 5/1999 | Vaishnav et al. | 296/37.1 |
| 5,941,590 A | * | 8/1999 | Reynolds et al. | 296/39.1 |
| 5,971,461 A | * | 10/1999 | Vaishnav et al. | 296/37.12 |
| 6,045,732 A | | 4/2000 | Nakatsuji et al. | |
| 6,155,625 A | * | 12/2000 | Felix | 296/37.14 |
| 2001/0030438 A1 | * | 10/2001 | Kamemizu et al. | 296/37.1 |
| 2003/0201571 A1 | | 10/2003 | Davis, Jr. et al. | |
| 2004/0000737 A1 | | 1/2004 | Durr | |

* cited by examiner

*Primary Examiner*—H. Gutman
(74) *Attorney, Agent, or Firm*—Brooks Kushman P.C.

(57) ABSTRACT

In at least certain embodiments, the present invention relates to a trim panel assembly and a method of making the same. The trim panel assembly comprises a housing having a perimeter portion defining an opening. The housing comprises a housing panel and a housing skin covering at least a portion of the housing panel. The trim panel assembly further comprises a door moveable between a first position wherein the door closes the opening to a second position wherein the door provides access to the opening. The door comprises a door panel and a door skin covering at least a portion of the door panel. The trim panel assembly further comprises a bumper disposed between the housing and the door. The bumper and at least one of the skins are made during the same injection molding step.

18 Claims, 3 Drawing Sheets

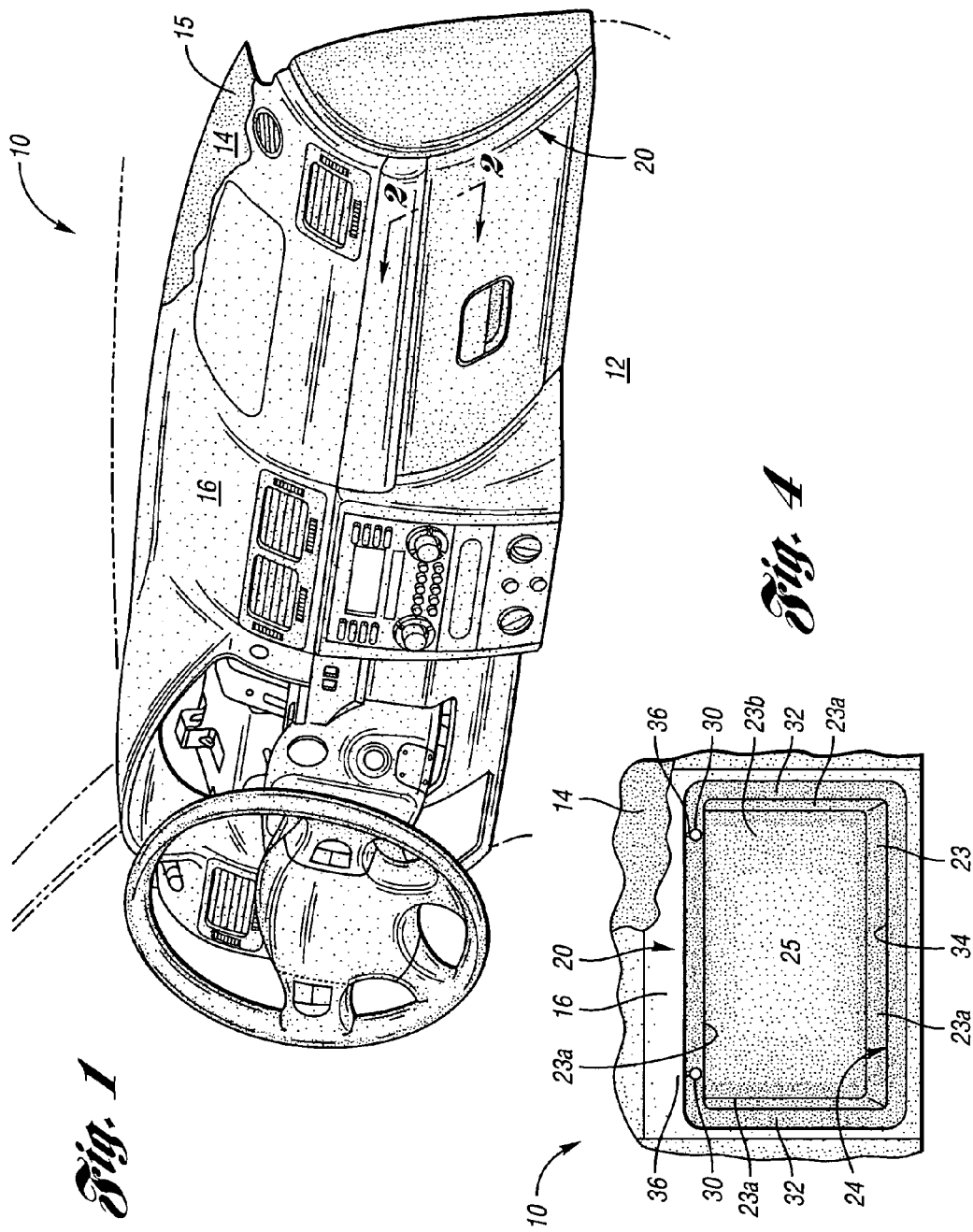

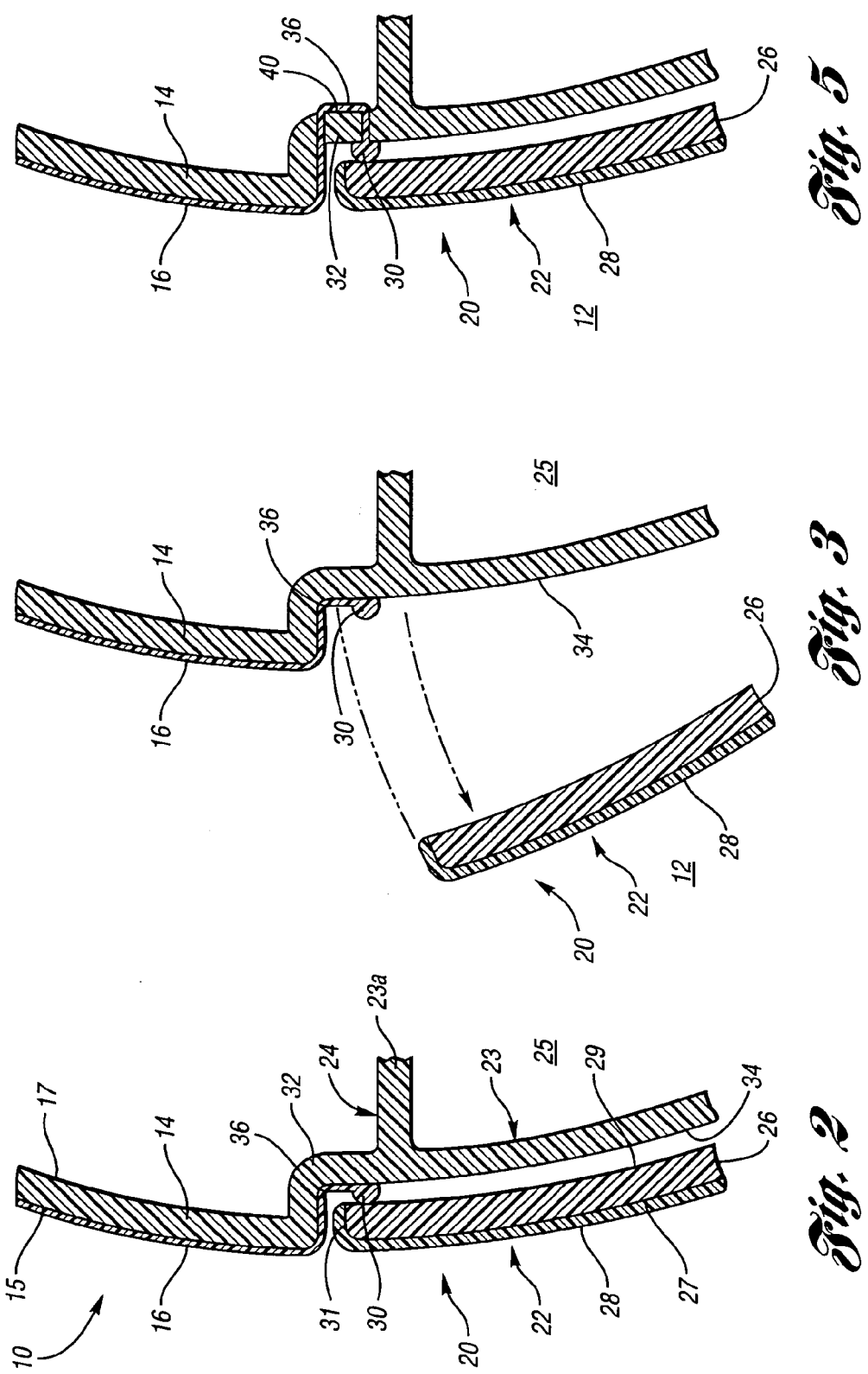

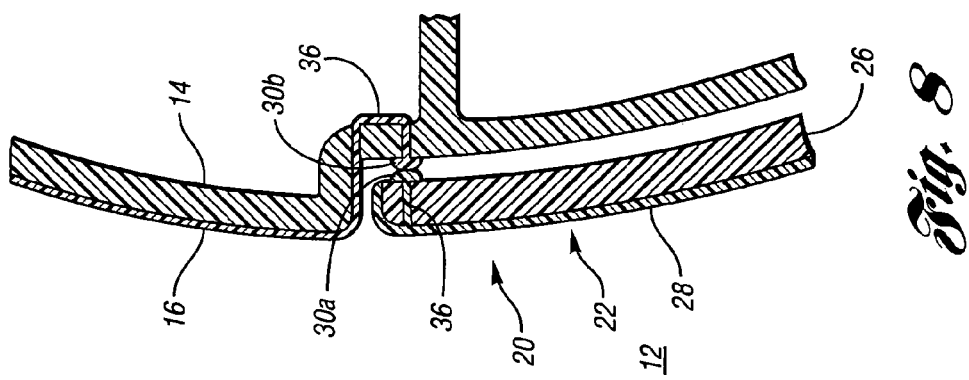
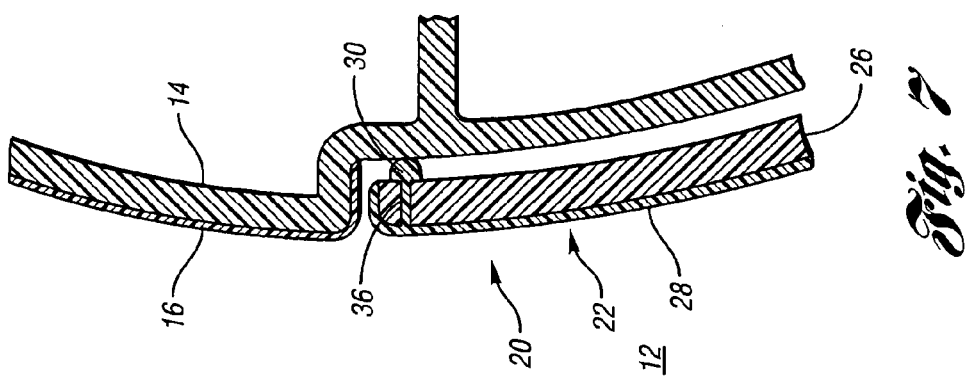
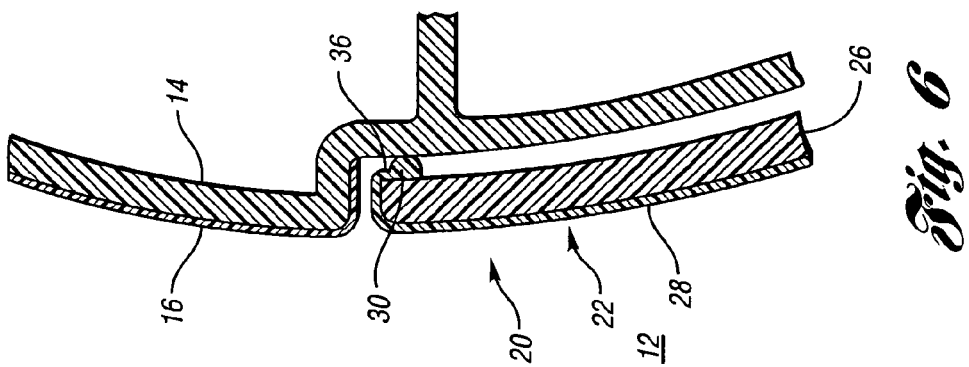

TRIM PANEL ASSEMBLY HAVING AN INTEGRATED DOOR BUMPER AND METHOD OF MANUFACTURE

BACKGROUND OF THE INVENTION

1. Field of the Invention

The present invention relates to trim panel assembly having an integrated door bumper and a method of manufacturing the same.

2. Background Art

Trim panel doors have been used- to close openings in vehicles. For instance, trim panel doors have been used to close openings in vehicle storage compartments, ash trays, and cup holders. A quite common example of such a use is the use of a trim panel door, such as a glove box door, to close a glove box opening. A glove box door is typically connected with a housing having an opening. The opening provides access to a glove box compartment. The door when in an open position provides access to the compartment and when closed covers the opening preventing access to the compartment.

To prevent rattling and undesirable noises associated therewith, elastomeric bumpers have been provided, typically placed on the housing perimeter forming the opening. These bumpers are typically separately manufactured and are press-fit into a small opening in the perimeter of the housing. This press fitting provides an extra step and an extra part during the manufacturing process, thus increasing cost and complexity of manufacture.

It would be desirable to provide a trim panel assembly having a door wherein the operability of a bumper is provided without having to provide an added part, such as a press-fit bumper.

SUMMARY OF THE INVENTION

In at least one embodiment, the present invention relates to a trim panel assembly. The trim panel assembly includes a housing having a perimeter portion defining an opening. The housing comprising a housing panel and a housing skin covering at least a portion of the housing panel. The trim panel assembly further includes a door moveable between a first position wherein the door closes the opening to a second position wherein the door provides access to the opening. The door comprises a door panel and a door skin covering at least a portion of the door panel. The trim panel assembly further includes a bumper disposed between the housing and the door. The bumper and at least one of the skins are made during the same injection molding step.

In at least one embodiment, the bumper may be located on the door.

In at least another embodiment, the bumper may be located on the housing perimeter portion.

In at least another embodiment, an extension portion may extend between and connect the bumper and either the door skin or the housing skin.

In at least another embodiment, the extension portion may extend through the door panel or the housing panel.

In at least another embodiment, the extension portion may extend around an edge of the door panel.

In at least one embodiment, the bumper may comprise a first portion on the door and a second portion facing the first portion and being located on the housing.

In at least another embodiment, a trim panel assembly of the present invention includes a housing having a perimeter portion defining an opening, with the housing comprising a housing panel and a housing skin covering at least a portion of the housing panel, a door moveable between a first position wherein the door closes the opening to a second position wherein the door provides access to the opening, with the door comprising a door panel and a door skin covering at least a portion of the door panel, and a bumper disposed between the housing and the door, with the bumper and at least one of the skins being made of a first material and at least one of the panels being made of a second material, more rigid than the first material.

In at least one embodiment, the present invention relates to a method for making trim panel assembly. The method comprises providing a housing comprising a housing panel having a perimeter portion defining an opening and a housing skin covering at least a portion of the housing panel. The method further comprises providing a door connectable with the housing which is moveable between a first position wherein the door closes the opening to a second position wherein the door provides access to the opening. The door comprises a door panel and a door skin covering at least a portion of the door panel. The method further comprises providing a bumper disposed between the housing and the door. The bumper and at least one of the skins are made during the same injection molding step.

In at least another embodiment, the door may be a glove box door and the housing may be a glove box compartment.

BRIEF DESCRIPTION OF THE DRAWINGS

FIG. 1 illustrates a perspective view of one embodiment of an instrument panel for a motor vehicle in accordance with the present invention;

FIG. 2 illustrates a view along line 2—2 of FIG. 1 with the door in a first position;

FIG. 3 is a view similar to FIG. 2 showing the door in a second position;

FIG. 4 illustrates a front view of a portion of the instrument panel of FIG. 1 with the door removed;

FIG. 5 is a view similar to FIG. 2 illustrating a second embodiment of the present invention;

FIG. 6 is a view similar to FIG. 2 illustrating a third embodiment of the present invention;

FIG. 7 is a view similar to FIG. 2 illustrating a fourth embodiment of the present invention; and FIG. 8 is a view similar to FIG. 2 illustrating a fifth embodiment of the present invention.

DETAILED DESCRIPTION OF THE PREFERRED EMBODIMENT(S)

As required, detailed embodiments of the present invention are disclosed herein. However, it is to be understood that disclosed embodiments are merely exemplary of the invention that may be embodied in various alternative forms. The Figures are not necessarily to scale, some features may be exaggerated or minimized to show details of particular components. Therefore, specific structural or functional details disclosed herein are not be interpreted as limiting, but merely as a representative basis for the claims and/or a representative basis for teaching one skilled in the art to variously employ the present invention.

Moreover, except for otherwise expressly indicated, all numeral quantities in this description and in the claims indicating amounts or conditions are to be understood as modified by the work (about) in describing the broader scope of the invention. Practice within the numerical limits as stated is generally preferred. Also, unless expressly stated to the contrary, percents, "parts of," and ratio values are by weight and the description of a group or class of materials as suitable or preferred for a given purpose in connection with the invention implies that mixtures of any two or more members of the group or class may be equally suitable or preferred.

Referring to FIGS. 1 and 2, there is illustrated a motor vehicle trim panel 10, such as an instrument panel, that is located essentially between a windshield (not shown) and an occupant compartment 12. While the trim panel is being illustrated as an instrument panel 10, it should be understood that other trim panels, such as those used to close vehicle compartments, such as ash trays and cup holders, can enjoy the benefits of the present invention. The panel 10 generally comprises a substrate 14 having a first surface 15 and a second surface 17. The first surface 15 of the substrate 14 faces the occupant compartment 12 and is covered at least in part by a cover skin 16. The substrate 14 can be made of any suitable material such as a relatively hard, relatively rigid material like polypropylene, polyethylene, TPO, PC (Polycarbonate), PC/ABS, ABS and SMA. The cover skin 16 may also be made of any suitable relatively non-rigid relatively soft material such as TPE, TEE, EPDM and any other suitable elastomeric materials.

The instrument panel 10 includes a glove box, generally indicated at 20. The glove box 20 comprises a glove box door 22 connected, preferably hingedly connected in at least one embodiment, to a glove box compartment 24. The glove box compartment 24 has a housing portion 23 made of the substrate material (i.e. the housing portion 23 is part of the substrate 14). In at least one embodiment, the housing portion 23 comprises four side walls 23a and a back wall 23b, as best shown in FIG. 4, that forms a storage unit 25 of the glove box compartment 24. It should be readily understood that other suitable storage unit configurations could be used, such as a substrate unit formed on the door 22 that pivots open when the door is opened.

The glove box compartment 24 has a perimeter portion 32, shown in the FIG. 4 to be a flange. The flange 32 defines an opening 34. The glove box opening 34 provides access to the storage unit 25 of the glove box compartment 24.

As best seen in FIG. 2, the glove box compartment 24 and the glove box opening 34 are closeable and coverable by the glove box door 22. When the door 22 is opened, as shown in FIG. 3, the opening 34 and storage unit 25 are accessible by the vehicle occupants. Referring again to FIG. 2, the glove box door 22 comprises a door panel 26 having a first surface 27 and a back surface 29. The first surface 27 of the door panel 26 faces the occupant compartment 12 and is covered, at least in part, by a door skin 28. The door panel 26 also includes an upper edge surface 31 that extends between and connects the surfaces 27 and 29 of the door panel 26. In at least one embodiment, the door panel 26 is made of the same material as the housing portion 23, i.e., the substrate. It should be understood however that the door panel 26 and the housing portion 23 could be made of different materials. The door skin 28, in at least one embodiment, is made of the same material as the cover skin 16. It should be understood however that the door skin 28 and the cover skin 16 could be made of different materials.

The instrument panel 10 includes at least one bumper 30. The bumper 30 provide a biasing effect between the glove box door 22 and the glove box compartment 24. The bumper 30 urges the door 22 away from the compartment 24 to prevent unwanted and unnecessary noise and rattling during vehicle operation. While only two bumpers 30 are shown, it should be understood that more or fewer bumpers 30 could be provided, as desired. As will be described further below, the bumpers 30 are made of the same material as either, or both, of the cover skin 16 and/or the door skin 28. The bumpers 30 can be made simultaneously with one of the skins 16 or 28 during a two-shot injection molding process, as will be described further below.

As shown in FIGS. 2–4, the bumpers 30, or bumper as the case may be, are provided on the face of the flange 32 and face towards the door 22. Extension portions 36 extend between and connect the cover skin 16 and the bumpers 30. In the embodiment, the extension portions 36 are made of the same material, and are made during the same molding process, as the bumpers 30 and the cover skin 16. In this embodiment, the extension portions 26 are located on the perimeter portion, i.e., flange 32, of the glove box compartment 24 facing the occupant compartment 12.

In another embodiment, as illustrated in FIG. 5, if it desirable to hide the extension portions 36, the extension portions 36 can extend through the flange 32 of the glove box compartment 24 at a first location and then extend along a back surface 40 of the flange 32, facing away from the occupant compartment, and then back through a second location of the flange 32. In this embodiment, the second location is below the first location.

In the embodiments illustrated in FIGS. 2–5, the bumpers 30 are made of the same material as the skin 16. The bumpers 30 and the skin 16 are made simultaneously during a two-shot injection molding process, as will be described further below.

In another embodiment, the bumpers 30 could be placed on the door 22 instead of on the glove box compartment 24. In one of these embodiments, as shown in FIG. 6, the extension portion 36 extend around the top edge 31 of the door panel 26 and down a back surface 29 of the door panel 26. In an alternative embodiment, as shown in FIG. 7, the extension portions 36 could extend through the door pane 26, from the front surface 27 to the back surface 29, so that the extension portions 36 are not visible to the eye. In the embodiments illustrated in FIGS. 6 and 7, the bumpers 30 are made of the same material as the door skin 28. The bumpers 30 and the door skin 28 are made simultaneously during a two-shot injection molding process, as will be described further below.

In yet another embodiment, as illustrated in FIG. 8, the bumpers 30 have a first portion 30a located on the door 22 and a second portion 30b located on the housing 24. In this embodiment, the bumpers 30a and 30b are able to be made in a smaller dimension then the bumpers 30 in the other embodiments. For instance, the bumpers 30 in this embodiment can have average heights of 0.1 to 1.5 mm and average widths of 0.5 to 4.0 mm, whereas the bumpers 30 in the other embodiments have average heights of 0.2 to 3.0 mm and average widths of 0.5 to 4.0. While the extension portions 36 are shown in FIG. 8 to be hidden from view, the extension portions 36 could extend either around the upper edge surface 37 on the door panel 26, on the face of the flange 32, or both and not through the door panel and/or flange 32. In this embodiment, the bumper 30a is made of the same material as the door skin 28 and the bumper 30b is made of the same material as skin 16. The bumper 30b and the skin 16 are made simultaneously during a two-shot injection molding process, as will be described further below. The bumper 30a and the door skin 26a are made simultaneously during a two-shot injection molding process, as will be described further below.

A method of forming the bumpers 30, 30a and/or 30b using a multi-shot or two-shot injection molding process will now be described. Such a process is generally described in U.S. patent application Ser. No. 10/131,015, assigned to Lear Corporation, is incorporated by reference herein in its entirety. The process allows the manufacture of assembly of at least one bumper to be integrated with the manufacturer and/or assembly of a trim component to improve quality, reduce manufacturing complexity, and reduce costs.

In a two-shot injection molding process, a first type of material is injected into an injection molded mold to form either the door panel 26 or the instrument panel 10 with the glove box compartment 24. And a second type material is injected into the injection molding mold to form one of the cover skin 16 or door skin 28, along with the bumpers 30, 30a and/or 30b and the extension portions 36. The mold may include one or more cams or slides that are actuated to create relief cavities to which the second material flows. Alternatively, different mold cavities may be employed for the first and second shots. For instance, a portion of the mold having material from the first shot may be indexed to a second position and made into another mold portion having appropriate relief cavities before injecting the second type material.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A trim panel assembly comprising:
    a housing having a perimeter portion defining an opening, the housing comprising a housing panel and a housing skin covering at least a portion of the housing panel;
    a door moveable between a first position wherein the door closes the opening to a second position wherein the door provides access to the opening, the door comprising a door panel and a door skin covering at least a portion of the door panel; and
    a bumper disposed between the housing and the door, the bumper and at least one of the skins being made during the same injection molding step.

2. The panel assembly of claim 1 wherein the bumper is located on the door or the housing perimeter portion.

3. The trim panel assembly of claim 2 wherein an extension portion extends between and connects the bumper and the housing skin.

4. The instrument panel of claim 3 wherein the extension portion has at least a portion extending through the housing panel.

5. The trim panel assembly of claim 3 wherein the extension portion is on the housing perimeter portion.

6. The trim panel assembly of claim 1 wherein an extension portion extends between and connects the bumper and the at least one skin, the extension portion and the bumper being made of the same material.

7. The trim panel assembly of claim 6 wherein the extension portion extends through the door panel.

8. The trim panel assembly of claim 6 wherein the extension portion extends around an edge of the door panel.

9. The trim panel assembly of claim 6 wherein the extension portion and the at least one of the skins are made of a first material, at least one of the door panel and the housing panel being made of a second material more rigid than the first material.

10. The trim panel assembly of claim 9 wherein the first material is an elastomer and the second material is rigid polymeric material.

11. The trim panel assembly of claim 1 wherein the bumper comprises a first portion on the door and a second portion facing the first portion and being located on the housing.

12. The trim panel assembly of claim 1 wherein the door is a glove box door and the housing is a glove box compartment.

13. The trim panel of claim 1 wherein the bumper and the at least one skin are made of the same material.

14. A trim panel assembly comprising:
    a housing having a perimeter portion defining an opening, the housing comprising a housing panel and a housing skin covering at least a portion of the housing panel;
    a door moveable between a first position wherein the door closes the opening to a second position wherein the door provides access to the opening, the door comprising a door panel and a door skin covering at least a portion of the door panel; and
    a bumper disposed between the housing and the door, the bumper and at least one of the skins being made of a first material and at least one of the panels being made of a second material, more rigid than the first material.

15. The panel assembly of claim 14 wherein the bumper is located on the door.

16. The trim panel assembly of claim 14 wherein the bumper is located on the housing perimeter portion.

17. The trim panel assembly of claim 14 wherein the bumper comprises a first portion on the door and a second portion facing the first portion and being located on the housing.

18. The trim panel assembly of claim 14 wherein the bumper and at least one of the skins are formed together during the same injection molding step within the same mold.

* * * * *